(12) United States Patent
Nakane

(10) Patent No.: US 8,556,404 B2
(45) Date of Patent: Oct. 15, 2013

(54) PHOTOCURABLE INK COMPOSITION FOR INK JET RECORDING, INK JET RECORDING METHOD, AND RECORDED MATERIAL

(75) Inventor: Hiroki Nakane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 232 days.

(21) Appl. No.: 13/053,663

(22) Filed: Mar. 22, 2011

(65) Prior Publication Data

US 2011/0234681 A1 Sep. 29, 2011

(30) Foreign Application Priority Data

Mar. 23, 2010 (JP) ................................. 2010-065839

(51) Int. Cl.
*C09D 11/00* (2006.01)

(52) U.S. Cl.
USPC .......................................................... 347/100

(58) Field of Classification Search
USPC .......................................................... 347/100
See application file for complete search history.

(56) References Cited

U.S. PATENT DOCUMENTS

| 2006/0036001 A1* | 2/2006 | Oyanagi et al. | 523/160 |
| 2006/0127591 A1* | 6/2006 | Itoh et al. | 427/466 |
| 2008/0282322 A1* | 11/2008 | Saito | 726/2 |

FOREIGN PATENT DOCUMENTS

| JP | 2004143245 A * | 5/2004 |
| JP | 2005-36079 A | 2/2005 |

* cited by examiner

*Primary Examiner* — Laura Martin
(74) *Attorney, Agent, or Firm* — Nutter McClennen & Fish LLP; John J. Penny, V; Christopher A. Potts

(57) ABSTRACT

Some embodiments include a photocurable ink composition for ink jet recording contains a cholesteric liquid crystal polymer, a polymerizable compound, and a photopolymerization initiator. In some embodiments, an ink jet recording method, comprising a process (a) for ejecting the photocurable ink composition for ink jet recording onto a recording medium using an ink jet recording apparatus, and a process (b) for irradiating the ejected photocurable ink composition for ink jet recording with light having an emission peak wavelength in the range of 350 nm or more and 430 nm or lower from a light source is disclosed.

17 Claims, 3 Drawing Sheets

PHOTOCURABLE INK COMPOSITION FOR INK JET RECORDING, INK JET RECORDING METHOD, AND RECORDED MATERIAL

BACKGROUND

1. Technical Field

The present invention relates to a photocurable ink composition for ink jet recording, an ink jet recording method using the same, and a recorded material.

2. Related Art

Heretofore, there has been a screen printing method using an ink containing a brightening material as a technique for imparting brightness to a base material. However, in order to represent patterns, figures, characters, and the like by screen printing, it has been required to prepare plates corresponding to the number of required patterns and the like, resulting in the necessity of a large number of printing processes.

Then, as one of the techniques for more simply imparting brightness to a base material, a technique for recoding images having brightness by charging an ink composition containing a bright pigment in an ink jet printer, and then ejecting the ink composition to a base material has been proposed (e.g., Japanese Unexamined Patent Application Publication No. 2005-36079). Japanese Unexamined Patent Application Publication No. 2005-36079 discloses that scaly metal pigments, glass flake pigments, mica pigments, cholesteric liquid crystal polymer pigments, and the like can be used as the bright pigment.

However, the cholesteric liquid crystal polymer which is one kind of the bright pigments usually has a thickness of about 5 μm in order to demonstrate brightness utilizing the selective reflectivity of light. Therefore, when images are recorded using an aqueous ink composition containing water and a water-based binder as the main ingredients as disclosed in Japanese Unexamined Patent Application Publication No. 2005-36079, the moisture in the aqueous ink composition volatilizes, and thus the cholesteric liquid crystal polymer is exposed to the surface of a recording medium, which has caused a problem in that the scratch resistance of images is very poor.

SUMMARY

An advantage of some aspects of the invention is to provide a photocurable ink composition capable of forming an image having brightness with excellent scratch resistance on a recording medium by an ink jet recording mode and an ink jet recording method using the same.

The invention has been made for solving at least one portion of the above-described problems and can be realized as the following aspects or application examples.

Application Example 1

According to one aspect of a photocurable ink composition for ink jet recording according to the invention contains:
  a cholesteric liquid crystal polymer;
  a polymerizable compound; and
  a photopolymerization initiator.

According to the photocurable ink composition for ink jet recording according to the application example 1, an image having brightness with excellent scratch resistance can be formed on a recording medium by an ink jet recording mode. When an image is recorded by an ink jet recording mode using the photocurable ink composition for ink jet recording of the application example 1, the film thickness of the image is 5 μm to 30 μm. Therefore, by carrying out photocuring, the cholesteric liquid crystal polymer having a thickness of about 5 μm is firmly held in the image. Thus, images having brightness with excellent scratch resistance can be formed.

Application Example 2

In the photocurable ink composition for ink jet recording according to the application example 1, phenoxyethylacrylate can be contained as the polymerizable compound.

Application Example 3

In the photocurable ink composition for ink jet recording according to the application example 2, at least one selected from alkylene glycol diacrylate and diacrylate having an alicyclic structure can be further contained as the polymerizable compound.

Application Example 4

In the photocurable ink composition for ink jet recording according to any one of the application examples 1 to 3, the content of the cholesteric liquid crystal polymer can be 10% by mass or more and 50% by mass or lower.

Application Example 5

In the photocurable ink composition for ink jet recording according to any one of the application examples 1 to 4, the viscosity at 20° C. can be 3 mPa·s or more and lower than 55 mPa·s.

Application Example 6

One aspect of an ink jet recording method of the invention includes:
  a process (a) for ejecting the photocurable ink composition for ink jet recording according to any one of the application examples 1 to 5 onto a recording medium using an ink jet recording apparatus; and
  a process (b) for irradiating the ejected photocurable ink composition for ink jet recording with light having an emission peak wavelength in the range of 350 nm or more and 430 nm or lower from a light source.

Application Example 7

In the ink jet recording method according to the application example 6, when the photocurable ink composition for ink jet recording is ejected onto the recording medium, the recording medium can be held at a temperature of 30° C. or more and 40° C. or lower in the process (a).

Application Example 8

In the ink jet recording method according to the application example 6 or 7, the interval between the process (a) and the process (b) can be 10 seconds or lower.

Application Example 9

One aspect of a recorded material of the invention is a recorded material on which recording is performed by the ink jet recording method according to the application examples 6 to 8, in which the thickness of an ink layer formed on the recording medium is 5 µm or more and 30 µm or lower.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
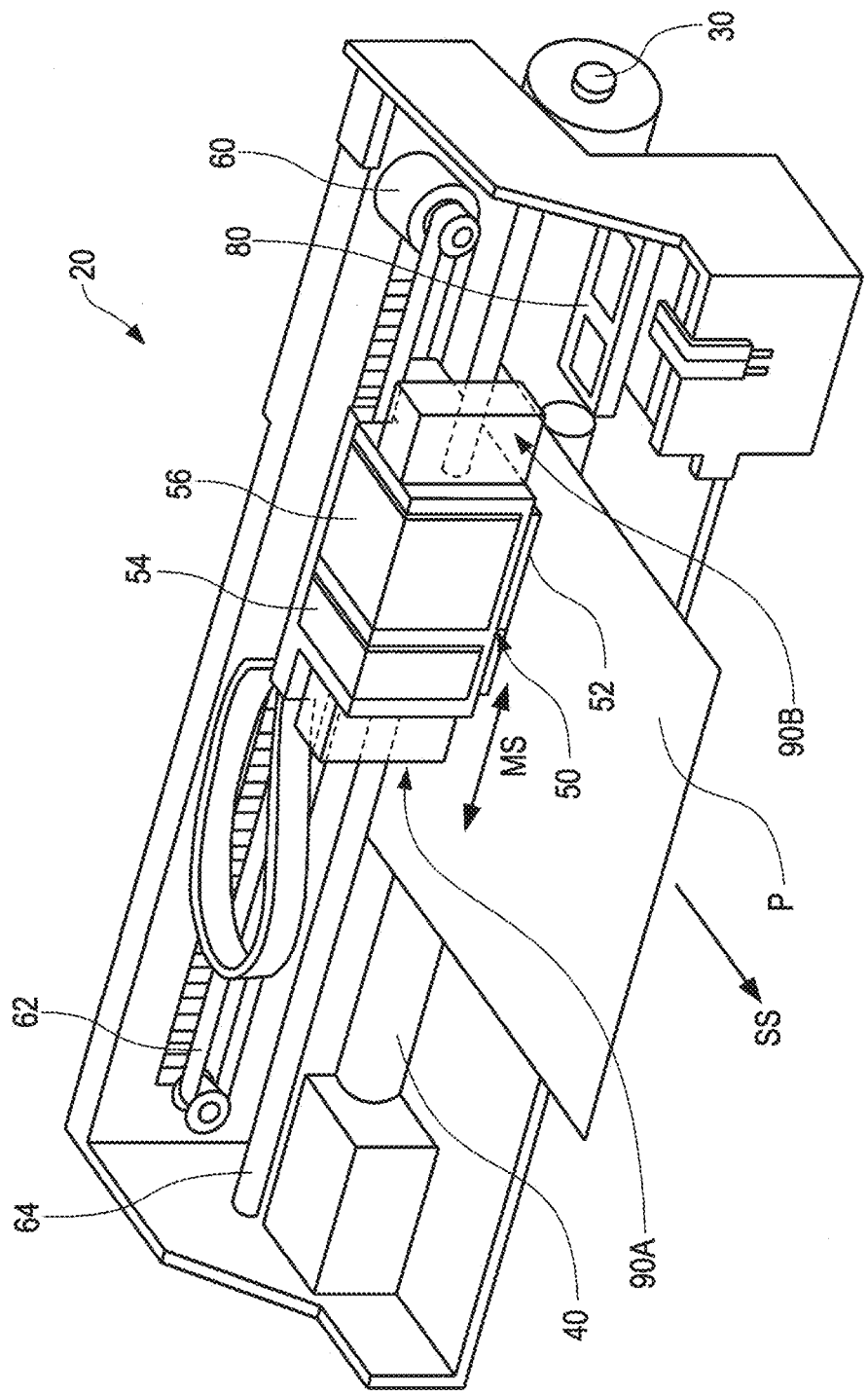
FIG. 1 is a perspective view of an ink jet recording apparatus that can be used for an ink jet recording method according to this embodiment.

Hereinafter, preferable embodiments of the invention will be described. The embodiments described below describe one example of the invention. The invention is not limited to the following embodiments and also includes various kinds of modifications carried out in the range where the gist of the invention is not altered. In the invention, an "image" refers to a printing pattern formed from a dot group and also includes text printing and solid printing.

1. Photocurable Ink Composition for Ink Jet Recording

An ink composition according to one embodiment of the invention can be applied to an ink jet recording mode of an ink jet printer or the like, in which a polymerization reaction proceeds by light irradiation to cure the ink composition to thereby form an image. As the essential ingredients, a cholesteric liquid crystal polymer, a polymerizable compound, and a photopolymerization initiator are mentioned. First, each ingredient contained in the photocurable ink composition for ink jet recording according to this embodiment will be described in detail below.

1.1. Cholesteric Liquid Crystal Polymer

The photocurable ink composition for ink jet recording according to this embodiment contains a cholesteric liquid crystal polymer as the essential ingredients. The cholesteric liquid crystal polymer has an effect of imparting glittering brightness to an image.

Cholesteric liquid crystal molecules form a spiral structure in the liquid crystal state. Therefore, when the cholesteric liquid crystal is polymerized to fix the spiral structure, and then light is emitted, circularly polarized light in a specific wavelength region corresponding to the rotation direction and the pitch width of the spiral of liquid crystal molecules is reflected. For example, when a visible light is emitted, lights having a wavelength of blue, green, yellow, and red corresponding to the pitch width of the liquid crystal are selectively reflected. Unlike pigments or dyes that development color by absorption of light, these color tones have visual dependence in which the color tone changes depending on the viewing angle. The pitch width of the cholesteric liquid crystal can be controlled by a temperature or a compound type. Therefore, a cholesteric liquid crystal polymer that selectively reflects not only visible light but near-infrared light or light in the ultraviolet region can also be manufactured.

The cholesteric liquid crystal polymer usable in the invention is not particularly limited insofar as a cholesteric liquid crystal layer is formed which has a physical molecular arrangement that selectively reflects a specific circularly polarized component in a given selective reflection wavelength region.

The cholesteric liquid crystal polymer can be manufactured by forming a cholesteric liquid crystal polymer layer on a support, separating the same, and then atomizing the polymer layer.

The shape of the cholesteric liquid crystal polymer is preferably a plate-like particular shape from the viewpoint of giving favorable brightness to images. Here, the "plate-like particular shape" refers to a shape satisfying that, when the major axis on the plane of the cholesteric liquid crystal polymer is defined as X, the minor axis thereof is defined as Y, and the thickness thereof is defined as Z, the 50% average particle size (R50) of the circle-equivalent diameter determined from the area of a substantially flat surface (X-Y plane) is 10 µm or more and 40 µm or lower and the thickness (Z) is 0.4 µm or more and 8 µm or lower.

The "circle-equivalent diameter" refers to the diameter of a circle having the same projected area as the projected area of the cholesteric liquid crystal polymer when the substantially flat surface (X-Y plane) of the cholesteric liquid crystal polymer is assumed to be the circle. For example, when the substantially flat surface (X-Y plane) of the cholesteric liquid crystal polymer is a polygon, the diameter of the circle obtained by converting the projected surface of the polygon into the circle is referred to the circle-equivalent diameter of the cholesteric liquid crystal polymer.

The 50% average particle size (R50) of the circle-equivalent diameter determined from the area of the substantially flat surface (X-Y plane) of the plate-like particles is preferably 10 µm or more and 40 µm or lower and more preferably 20 µm or more and 40 µm or lower from the viewpoint of securing favorable ejection stability in an ink jet printer. When the R50 is in the range mentioned above, clogging of a nozzle in continuous printing with an ink jet printer can be prevented and sufficient brightness can be imparted to images, although depending on the diameter of the nozzle of a head of the ink jet printer.

The maximum particle size of the circle-equivalent diameter determined from the area of the substantially flat surface (X-Y plane) of the plate-like particles is preferably 50 µm or lower. By adjusting the maximum particle size to 50 µm or lower, the cholesteric liquid crystal polymer can be prevented from clogging in a nozzle of an ink jet printer, a foreign substance removal filter provided in an ink flow path, or the like.

The major axis X, the minor axis Y, and the circle-equivalent diameter on the plane of the plate-like particles can be measured using a particle image analysis apparatus. As the particle image analysis apparatus, a flow particle image analyzer FPIA-2100, FPIA-3000, or FPIA-3000S (all manufactured by SYSMEX CORPORATION) is mentioned, for example.

From the viewpoint of imparting favorable brightness to an image, the thickness (Z) is preferably 0.4 µm or more and 8 µm or lower and more preferably 1 µm or more and 6 µm or lower.

As the cholesteric liquid crystal polymer, a commercially available one can be used and, for example, HELICONE series, such as HELICONE SCARABEUS XS, HELICONE JADE XS, HELICONE AQUARIUS XS, HELICONE SAPPHIRE XS, HELICONE MAPLE XS, and HELICONE TITANIUM XS (all manufactured by Wacker Silicones), are mentioned.

The content of the cholesteric liquid crystal polymer is preferably 10% by mass or more and 50% by mass or lower based on the total mass of the photocurable ink composition. When the content of the cholesteric liquid crystal polymer is in the range mentioned above, glittering brightness can be imparted to an image and also the curing properties of an image become good. When the content of the cholesteric liquid crystal polymer is lower than 10% by mass, the brightness imparted to images is sometimes poor. In contrast, when the content exceeds 50% by mass, the viscosity of the ink composition becomes high, and thus ejection properties are sometimes impaired.

1.2. Polymerizable Compound

The photocurable ink composition according to this embodiment contains a polymerizable compound as the essential ingredients. Examples of the polymerizable compound include the following monofunctional acrylates, bifunctional acrylates, trifunctional acrylates, urethane oligomers, epoxy acrylate oligomers, amino acrylates, and N-vinyl compounds.

For example, mentioned as the monofunctional acrylates are, but not particularly limited thereto, (2-methyl-2-ethyl-1,3-dioxolane-4-yl)methyl(meth)acrylate, (2-methyl-2-isobutyl-1,3-dioxolane-4-yl)methyl(meth)acrylate, phenoxyethyl (meth)acrylate, isobornyl(meth)acrylate, methoxy diethylene glycol mono(meth)acrylate, (meth)acryloyl morpholine, dicyclopentenyloxyethyl(meth)acrylate, dicyclopentenyl(meth)acrylate, dicyclopentanyl(meth)acrylate, trimethylolpropane(meth)acrylate, adamantyl(meth)acrylate, oxetane(meth)acrylate, 3,3,5-trimethylcyclohexane(meth) acrylate, and the like. These monofunctional acrylates can also be used singly or in combination of two or more kinds thereof. In this description, the (meth)acrylate represents acrylate or methacrylate.

For example, mentioned as the bifunctional acrylates are, but not particularly limited thereto, alkyleneglycol di(meth)acrylates, di(meth)acrylates having an alicyclic structure, and the like. Mentioned as the alkylene glycol di(meth)acrylates are ethylene glycol di(meth)acrylate, diethylene glycol di(meth)acrylate, dipropyrene glycol di(meth)acrylate, tripropylene glycol di(meth)acrylate, 1,9-nonane diol di(meth)acrylate, polyethylene glycol di(meth)acrylate, tetraethylene glycol di(meth)acrylate, 1,6-hexanediol di(meth) acrylate, neopentyl glycol di(meth)acrylate, 2-hydroxy-1,3-di(meth)acryloxypropane, and the like. Mentioned as the di(meth)acrylates having an alicyclic structure are dioxane glycol di(meth)acrylate, isocyanuric acid EO-modified di(meth)acrylate, dimethyrol tricyclodecane di(meth)acrylate, 1,3-adamantanediol di(meth)acrylate, and the like. These bifunctional acrylates can also be used singly or in combination of two or more kinds thereof.

For example, mentioned as the trifunctional acrylates are, but not particularly limited thereto, are trimethylolpropane tri(meth)acrylate, trimethylolpropane EO-modified tri(meth) acrylate, trimethylolpropane PO-modified tri(meth)acrylate, glycerin PO-modified tri(meth)acrylate, isocyanuric acid EO-modified tri(meth)acrylate, and the like. These trifunctional acrylates can also be used singly or in combination of two or more kinds thereof.

For example, mentioned as the urethane oligomers are oligomers generated by an addition reaction of polyol and polyisocyanate and a polyhydroxy compound, for example. The urethane oligomer is one having one or more urethane bonds and unsaturated double bonds capable of undergoing radical polymerization in the molecules and refers to a molecule with a medium degree of a relative molecular mass (synonymous with a molecular weight) having a small number of units, generally having about 2 to about 20 repetition structures, substantially or conceptually obtained from molecules having a small relative molecular mass. As the urethane oligomer, commercially available CN963J75, CN964, CN965, CN966J75, (all available from SARTOMER), and the like can be used.

Mentioned as the epoxy acrylate oligomer are, for example, an epoxy acrylate oligomer containing a bifunctional bisphenol A as a base. Similarly as the urethane oligomer, the oligomer refers to a molecule with a medium degree of a relative molecular mass (synonymous with a molecular weight) having a small number of units, generally having about 2 to about 20 repetition structures, substantially or conceptually obtained from molecules having a small relative molecular mass. As the epoxy acrylate oligomer, commercially available CN120 and CN131B (all available from SARTOMER) and the like can be used.

For example, mentioned as the amino acrylate is, but not particularly limited thereto, one obtained by reacting a bifunctional (meth)acrylate and an amine compound.

Mentioned as the bifunctional acrylate are, for example, alkylene glycol di(meth)acrylates, such as propylene glycol di(meth)acrylate, 1,3-butylene glycol di(meth)acrylate, 1,4-butanediol di(meth)acrylate, 1,6-hexanediol di(meth)acrylate, 1,9-nonanediol di(meth)acrylate, and neopentyl glycol di(meth)acrylate, bisphenol alkylene oxide adduct di(meth) acrylates, such as di(meth)acrylate of an ethylene oxide adduct of bisphenol S, di(meth)acrylate of an ethylene oxide adduct of bisphenol F, di(meth)acrylate of an ethylene oxide adduct of bisphenol A, di(meth)acrylate of an ethylene oxide adduct of thiobisphenol, and di(meth)acrylate of an ethylene oxide adduct of bromination bisphenol A, polyalkylene glycol di(meth)acrylates, such as polyethylene glycol di(meth) acrylate and polypropylene glycol di(meth)acrylate, di(meth) acrylate of neopentyl glycol hydroxypivalate, and the like.

Mentioned as the amine compound are, for example, monofunctional amine compounds, such as ethylamine, n-propylamine, isopropylamine, n-butylamine, isobutylamine, n-pentylamine, isopentylamine, n-hexylamine, cyclohexylamine, n-heptylamine, n-octylamine, 2-ethylhexylamine, n-nonylamine, n-decylamine, n-dodecylamine, n-tetradecylamine, n-hexadecylamine, n-octadecylamine, benzylamine, and phenethylamine and polyfunctional amine compounds, such as, diethylenetriamine, triethylenetetramine, tetraethylenepentamine, 1,6-hexamethylenediamine, 1,8-octamethylenediamine, 1,12-dodecamethylenediamine, o-phenylenediamine, p-phenylenediamine, m-phenylenediamine, o-xylylenediamine, p-xylylenediamine, m-xylylenediamine, menthanediamine, bis(4-amino-3-methylcyclohexylmethane), 1,3-diaminocyclohexane, isophoronediamine, and spiroacetaldiamine. In addition, high molecular weight polyfunctional amine compounds, such as polyethyleneimine, polyvinylamine, and polyallylamine, may be used.

Mentioned as the N-vinyl compound are N-vinyl formamide, N-vinyl carbazole, N-vinyl acetamide, N-vinyl pyrrolidone, N-vinyl caprolactam, derivatives thereof, and the like.

Among the polymerizable compounds mentioned above, phenoxyethyl(meth)acrylate is preferably used. This is because the phenoxyethyl(meth)acrylate not only has excellent dispersion stability of the cholesteric liquid crystal polymer but can suppress the repetition pitch width in the cholesteric liquid crystal. Furthermore, this is because the viscosity of the photocurable ink composition is easily adjusted to 3 to 55 mPa·s that is applicable to an ink jet recording mode and the curing properties of images become good.

The content of the polymerizable compound is preferably 20% by mass or more and more preferably 20% by mass or more and 95% by mass or lower based on the total mass of the photocurable ink composition. When the content of the polymerizable compound is 20% by mass or more, an image formed on a recording medium can be imparted with favorable curing properties. In contrast, when the content of the polymerizable compound is lower than 20% by mass, the curing properties of an image formed on a recording medium sometimes become insufficient.

When the phenoxyethyl(meth)acrylate is used as the polymerizable compound, it is more preferable to further use at least one selected from alkylene glycol diacrylate and diacrylate having an alicyclic structure. The alkylene glycol diacrylate and the diacrylate having an alicyclic structure can function as a crosslinking agent and can increase the film strength of an image recorded on a recording medium. In particular, the diacrylate having an alicyclic structure can more effectively increase the film strength of an image due to having a bulky molecular structure.

1.3. Photopolymerization Initiator

The photocurable ink composition in this embodiment contains a photopolymerization initiator as the essential ingredients. As the photopolymerization initiator, a molecule cleavage type or a hydrogen drawing type may be used.

Mentioned as the molecule cleavage type photopolymerization initiator are, for example, 2,4,6-trimethylbenzoyl diphenylphosphine oxide, bis(2,4,6-trimethylbenzoyl)phenylphosphine oxide, bis(2,4,6-dimethoxybenzoyl)-2,4,4-trimethylpentyl phosphine oxide, and the like. The reason why the molecule cleavage type photopolymerization initiator described above is preferable resides in the fact that since the structure of a chromophoric group considerably changes before and after photocleavage, the absorption of light considerably changes and a reduction in light absorption referred to as photobleaching (light fading) is observed. Thus, light penetrates to the inside a coating film ejected onto a recording medium, and thus the curing properties of images can be increased.

Mentioned as the hydrogen drawing type photopolymerization initiator is, for example, 2,4-diethylthioxanthone, 2-isopropylthioxanthone, and the like. The reason why the hydrogen drawing type photopolymerization initiator described above is preferable resides in the fact that the initiator reacts with oxygen remaining in a reaction system to thereby reduce the oxygen concentration in the reaction system. More specifically, the degree of radical polymerization inhibition can be reduced corresponding to the reduction in the oxygen concentration, and thus the surface curing properties can be improved.

These photopolymerization initiators can also be used singly or in combination of two or more kinds thereof.

When the photocurable composition according to this embodiment is cured by a UV LED, it is preferable to use a photopolymerization initiator having the maximum absorption wavelength in a wavelength region of 350 nm or more and 430 nm or lower. It is more preferable that the molar absorption coefficient at 365 nm of the photopolymerization initiator is 300 or more. This is because the photopolymerization initiator having a molar absorption coefficient at 365 nm of 300 or more sufficiently functions with a UV LED in which the energy of the irradiated light is relatively low. The molar absorption coefficient indicates the intensity of a substance for absorbing a specific wavelength light. The molar absorption coefficient of the photopolymerization initiator can be determined in accordance with the Lambert-Beer law by measuring the absorbance at 365 nm of a solution, in which the photopolymerization initiator has been dissolved in acetonitrile, using a spectrum photometer U-3300 (manufactured by Hitachi High-Technologies Corporation).

From the above-described viewpoints, when the photocurable composition according to this embodiment is cured by a UV LED, 2,4,6-trimethylbenzoyldiphenyl phosphine oxide and bis(2,4,6-trimethylbenzoyl)phenyl phosphine oxide are preferable.

Specifically, mentioned as the 2,4,6-trimethylbenzoyl-diphenyl phosphine oxide is DAROCUR TPO (trade name, manufactured by Ciba Japan, Inc.). Mentioned as the bis(2,4,6-trimethylbenzoyl)phenyl phosphine oxide is IRGACURE 819 (trade name, manufactured by Ciba Japan, Inc.).

The content of the photopolymerization initiator is preferably 3% by mass or more and 15% by mass or lower and more preferably 7% by mass or more and 13% by mass or lower based on the total mass of the photocurable ink composition.

1.4. Other Additives

The photocurable ink composition according to this embodiment can contain additives, such as pigments, dispersants, surfactants, optical sensitizers, and polymerization inhibitors, as required.

The photocurable ink composition according to this embodiment is preferably a solvent-free photocurable ink composition not containing organic solvents.

The photocurable ink composition according to this embodiment can be used as it is, and pigments may be further added. Pigments usable in this embodiment are not particularly limited, and inorganic pigments or organic pigments are mentioned. As the inorganic pigments, in addition to titanium oxide and iron oxide, carbon black manufactured by known methods, such as a contact method, a furnace method, a thermal method, or the like, can be used. In contrast, usable as the organic pigments are azo pigments (including an azo lake, an insoluble azo pigment, a condensed azo pigment, a chelate azo pigment, and the like), polycyclic pigments (e.g., a phthalocyanine pigment, a perylene pigment, a perynone pigment, an anthraquinone pigment, and a quinofuralone pigment), a nitro pigment, a nitroso pigment, aniline black, and the like.

Mentioned as the carbon black among the specific examples of the pigments usable in this embodiment is C.I. Pigment black 7. Examples include No. 2300, No. 900, MCF88, No. 33, No. 40, No. 45, No. 52, MA7, MA8, MA100, No. 2200B, and the like available from Mitsubishi Chemical, Inc., Raven 5750, 5250, 5000, 3500, 1255, 700, and the like available from Colombia Chemical Company, Regal 400R, 330R, and 660R, MogulL 700, Monarch 800, 880, 900, 1000, 1100, 1300, and 1400, and the like available from Cabot Corp., Color Black FW1, FW2, FW2V, FW18, and FW200, Color BlackS150, S160, and S170, Printex35, U, V, and 140U, and Special Black 6, 5, 4A, and 4 available from Degussa.

Mentioned as pigments usable when forming the photocurable ink composition according to this embodiment into a yellow ink are, for example, C.I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213, and the like.

Mentioned as pigments usable when forming the photocurable ink composition according to this embodiment into a magenta ink are, for example, C.I. Pigment Red 5, 7, 12, 48 (Ca), 48 (Mn), 57 (Ca), 57:1, 112, 122, 123, 168, 184, 202, and 209, C.I. Pigment Violet 19, and the like.

Mentioned as pigments usable when forming the photocurable ink composition according to this embodiment into a cyan ink are, for example, C.I. Pigment Blue 1, 2, 3, 15:3, 15:4, 16, 22, and 60, and the like.

Mentioned as pigments usable when forming the photocurable ink composition according to this embodiment into a green ink are, for example, C.I. Pigment Green 7, 8, and 36, and the like.

Mentioned as pigments usable when forming the photocurable ink composition according to this embodiment into an orange ink are, for example, C.I. Pigment Orange 51 and 66, and the like.

Mentioned as pigments usable when forming the photocurable ink composition according to this embodiment into a white ink are, for example, a basic lead carbonate, a zinc oxide, a titanium oxide, a strontium titanate, and the like.

The average particle size of the pigments usable in this embodiment is preferably in the range of 10 nm to 350 nm and more preferably in the range of 50 nm to 200 nm.

The addition amount of the pigment that can be added to the photocurable ink composition according to this embodiment is preferably 0.1 part by mass to 25 parts by mass and more preferably 0.5 part by mass to 15 parts by mass based on 100 parts by mass of reaction ingredients.

To the photocurable ink composition according to this embodiment, dispersants may be added in order to increase the dispersibility of the pigments mentioned above. Mentioned as the dispersants usable in this embodiment are high molecular weight dispersants, such as Solsperse 3000, 5000, 9000, 12000, 13240, 17000, 24000, 26000, 28000, and 36000 (all manufactured by Lubrizol Corporation), DISCOALL N-503, N-506, N-509, N-512, N-515, N-518, and N-520 (all manufactured by DAI-ICHI KOGYO SEIYAKU Co., Ltd.), and the like.

To the photocurable ink composition according to this embodiment, surfactants may be added. As the surfactants usable in this embodiment are preferably silicone surfactants and more preferably polyester-modified silicone surfactants or polyether-modified silicone surfactants. Specific examples of the polyester-modified silicone surfactants include BYK-347 and 348, BYK-UV3500, 3510, and 3530 (all manufactured by BYK-Chemie Japan K.K.). Specific examples of the polyether-modified silicone surfactants include BYK-378 and BYK-3570 (manufactured by BYK-Chemie Japan K.K.).

To the photocurable ink composition according to this embodiment, optical sensitizers may be added. Mentioned as the optical sensitizers usable in this embodiment are amine compounds (aliphatic amine, amine containing an aromatic group, piperidine, a reaction product of an epoxy resin and amine, triethanolamine triacrylate, and the like), urea compounds (allyl thiourea, o-tolylthiourea, and the like), sulfur compounds (sodium diethyl dithiophosphate, a soluble salt of aromatic sulfinic acid, and the like), nitrile compounds (N,N-diethyl-p-aminobenzonitrile and the like), phosphorus compounds (tri-n-butylphosphine, sodium diethyl dithiophosphide, and the like), nitrogen compounds (Michler's ketone, N-nitrosohydroxylamine derivatives, oxazolidine compounds, tetrahydro-1,3-oxazine compounds, condensates of formaldehyde or acetaldehyde and diamine, and the like), chloride compounds (carbon tetrachloride, hexachloro ethane, and the like), and the like.

To the photocurable ink composition according to this embodiment, polymerization inhibitors may be added. Mentioned as the polymerization inhibitors usable in this embodiment are hydroquinone, benzoquinone, p-methoxy phenol, hydroquinone monomethyl ether, and the like.

1.5. Physical Properties

The viscosity at 20° C. of the photocurable ink composition for ink jet recording according to this embodiment is preferably 3 to 55 mPa·s and more preferably 10 to 30 mPa·s. When the viscosity at 20° C. of the photocurable ink composition is in the range mentioned above, an appropriate amount of the photocurable ink composition is ejected from a nozzle and curved flight or scattering of the photocurable ink composition can be further reduced. Thus, the ink composition can be preferably used for an ink jet recording apparatus. The viscosity can be measured by increasing the Shear Rate to 10 to 1000 under a 20° C. environment, and then reading the viscosity at the Shear Rate of 200 using a viscoelasticity tester MCR-300 (manufactured by Pysica).

The surface tension at 20° C. of the photocurable ink composition for ink jet recording according to this embodiment is preferably 20 mN/m or more and 30 mN/m or lower. When the surface tension at 20° C. of the photocurable ink composition is in the range mentioned above, the photocurable ink composition is difficult to be wetted with a nozzle subjected to water repellent treatment. Thus, an appropriate amount of the photocurable ink composition is ejected from a nozzle and curved flight or scattering of the photocurable ink composition can be further reduced. Thus, the ink composition can be preferably used for an ink jet recording apparatus. The surface tension can be measured by confirming the surface tension when a platinum plate is wetted with ink under a 20° C. environment using an automatic surface tension meter CBVP-Z (manufactured by Kyowa Interface Science Co., LTD.).

2. Ink Jet Recording Method

An ink jet recording method according to one embodiment of the invention includes: (a) a process for ejecting the photocurable ink composition for ink jet recording described above onto a recording medium using an ink jet recording apparatus; and (b) a process for irradiating the ejected photocurable ink composition with a light having an emission peak wavelength in the range of 350 nm or more and 430 nm or lower from a light source.

Hereinafter, the ink jet recording method according to this embodiment will be described for every process.

2.1. Process (a)

This process is a process for ejecting the photocurable ink composition for ink jet recording described above onto a recording medium using ink jet recording apparatus.

The photocurable ink composition for ink jet recording is as described above and thus a detailed description is omitted.

For example, mentioned as the recording medium are, but not particularly limited thereto, plastics, such as polyvinyl chloride, polyethylene terephthalate, polypropylene, polyethylene, and polycarbonate and the plastics whose surface has been treated, glass, coated paper, and the like.

In the ink jet recording method according to this embodiment, an ink jet recording apparatus is used as a measure for ejecting the photocurable ink composition and, for example, an ink jet recording apparatus described below can be used.

FIG. 1 is a perspective view of an ink jet recording apparatus usable in the ink jet recording method according to this embodiment.

An ink jet recording apparatus 20 illustrated in FIG. 1 has a motor 30 that feeds a recording medium P in a sub-scanning direction SS, a platen 40, a printing head 52 as a recording head that injects the photocurable ink composition for ink jet recording while reducing the particle size thereof to a fine particle size from a head nozzle so that the ink composition is ejected onto a recording medium P, a carriage 50 carrying the printing head 52, a carriage motor 60 that moves the carriage 50 in a main scanning direction MS, and a pair of light irradiation devices 90A and 90B that irradiate the ink adhesion surface on the recording medium P, to which the photocurable ink composition for ink jet recording has been ejected by the printing head 52, with light.

The carriage 50 is drawn with a drawing belt 62 driven by the carriage motor 60 to move along a guide rail 64.

The printing head 52 illustrated in FIG. 1 is a serial head for full color printing that injects inks of 3 or more colors, and a large number of head nozzles are provided for every color. The nozzle diameter of the printing head 52 is preferably 200 μm or more from the viewpoint of using the cholesteric liquid crystal polymer having a 50% average particle size of about 10 μm or more and 40 μm or lower. On the carriage 50 on which the printing head 52 is mounted, a black cartridge 54 as a black ink container containing a black ink to be supplied to the printing head 52 and a color ink cartridge 56 as a color ink container containing a color ink to be supplied to the printing head 52 are mounted in addition to the printing head 52. The photocurable ink composition for ink jet recording according to this embodiment may be accommodated in any of the cartridges 54 and 56.

At the home position (position on the right side of FIG. 1) of the carriage 50, a capping device 80 for capping the nozzle surface of the printing head 52 during stopping is provided. When the carriage 50 reaches the position above the capping device 80 after the completion of printing job, the capping device 80 automatically rises according to a mechanism, which is not illustrated, to cap the nozzle surface of the printing head 52. The capping prevents the ink in the nozzle from drying. The positioning control of the carriage 50 is performed for, for example, accurately positioning the carriage 50 at the position of the capping device 80.

By the use of such an ink jet recording apparatus 20, the photocurable ink composition for ink jet recording can be ejected onto the recording medium P. When ejecting the photocurable ink composition for ink jet recording onto the recording medium P, the recording medium P may be held at a temperature of 30° C. or more and of 40° C. or lower beforehand. By holding the recording medium P in the temperature range mentioned above, the ink line width can be set to a favorable state. Measures for holding the recording medium P in the temperature range mentioned above are not particularly limited and measures for controlling the temperature by providing a heater or a hot air drier to a recording medium feeding mechanism, which is not illustrated, is mentioned, for example.

According to the ink jet recording apparatus 20, the process (a) and the process (b) can be continuously performed with one apparatus instead of separately performing the process (a) and the process (b) with separate apparatuses.

2.2. Process (B)

This process is a process for irradiating the ejected photocurable ink composition for ink jet recording with a light having an emission peak wavelength in the range of 350 nm or more and 430 nm or lower from a light source. According to this process, by irradiating the curable ink composition for ink jet recording ejected onto the recording medium with a light of a specific wavelength, the photocurable ink composition for ink jet recording is cured, and an image can be recorded on the recording medium.

Hereinafter, the case where the process (b) is performed using the ink jet recording apparatus 20 described above will be described in detail.

Figure 2:
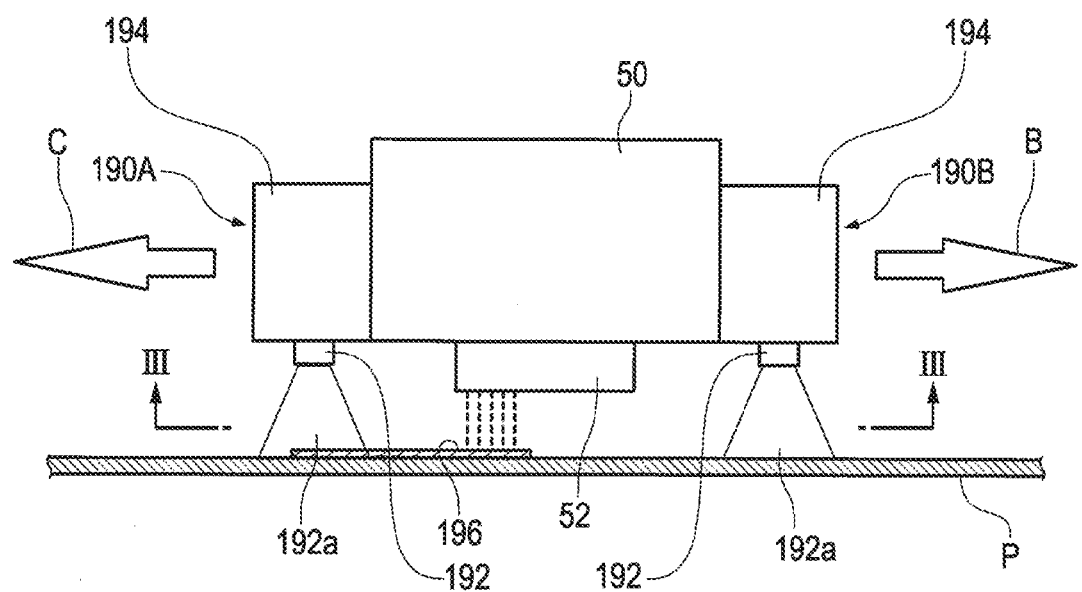
FIG. 2 is a front view of a light irradiation device shown in FIG. 1.
Figure 3:
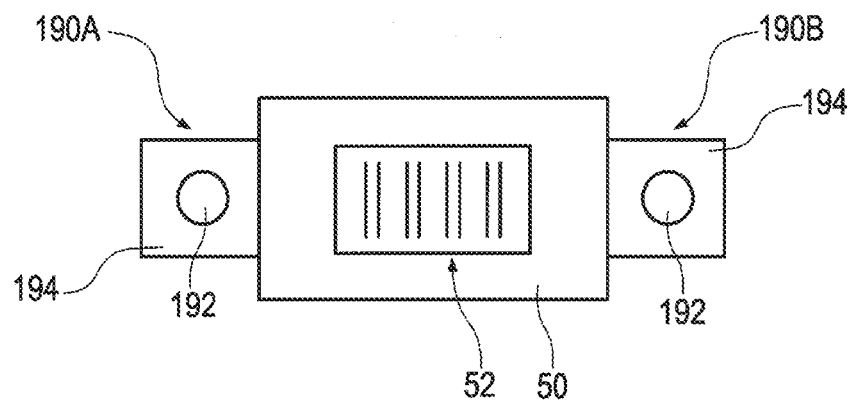
FIG. 3 is an arrow view along the II-II line of FIG. 2.

FIG. 2 is a front view of light irradiation devices 90A (equivalent to 190A of FIG. 2) and 90B (equivalent to 190B of FIG. 2) illustrated in FIG. 1. FIG. 3 is an arrow view along the II-II line of FIG. 2.

As illustrated in FIGS. 1 to 3, the light irradiation devices 190A and 190B are individually attached to each of both side ends along the movement direction of the carriage 50.

As illustrated in FIG. 2, the light irradiation device 190A attached to the observer's left side of the printing head 52 irradiates an ink layer 196 ejected onto the recording medium P with light during right scanning in which the carriage 50 moves rightward (direction indicated by the arrow B of FIG. 2). In contrast, the light irradiation device 190B attached to the observer's right side of the printing head 52 irradiates the ink layer 196 ejected onto the recording medium P during left scanning in which the carriage 50 moves leftward (direction indicated by the arrow C of FIG. 2).

Here, the timing for irradiating the ink layer 196 ejected onto the recording medium P with light may be set to be preferably 10 seconds or lower, more preferably 0.01 second or more and 10 seconds or lower, and particularly preferably 1 second or more and 5 seconds or lower after the ink is ejected onto the recording medium P. This is because when the timing is set in such a manner as to exceed 10 seconds, the movement rate of the carriage 50 needs to be made low, which sometimes results in a sharp reduction in the printing rate.

The light irradiation devices 190A and 190B are attached to the carriage 50 and each have a case 194 supporting one light source 192 in alignment and a light source control circuit (not illustrated) that controls light-on and light-off of the light sources 192. As illustrated in FIGS. 2 and 3, the light irradiation devices 190A and 190B each have one light source 192 and may have two or more light sources. As the light source 192, it is preferable to use either LED or LD. Thus, as compared with the case where a mercury lamp, a metal halide lamp, and other lamps are used as the light source, an increase in the size of the light source due to equipment of a filter or the like can be avoided. The intensity of the emitted light does not decrease due to the absorption with a filter and the photocurable ink composition for ink jet recording can be efficiently cured.

In each light source 192, the wavelength of the light to be emitted may be the same or different. When LED or LD is used as the light source 192, the emission peak wavelength of the light to be emitted may be in the range of about 350 to 430 nm.

According to the light irradiation devices 190A and 190B, the ink layer 196 adhered onto the recording medium P by the ejection from the printing head 52 is irradiated with lights 192a by the light sources 192 that irradiate portions above the recording-medium P near the printing head 52 as illustrated in FIG. 2, whereby the surface and the inside of the ink layer 196 can be cured.

The light irradiation amount varies depending on the thickness of the ink layer 196 adhered onto the recording medium P, and thus cannot be strictly specified and preferable conditions are selected as appropriate. Since the photocurable ink composition for ink jet recording described above is used, the ink layer can be sufficiently cured with the light irradiation amount of about 300 to 1000 mJ/cm$^2$.

According to the ink jet recording apparatus 20, also in the case of full color printing with a photocurable ink composition for ink jet recording having a low viscosity and an ink layer having a relatively thin film thickness, two or more of the photocurable ink compositions ejected onto the recording medium P can be favorably cured without causing problems of bleeding or mixing of colors.

The structure of the ink jet recording apparatus 20 is not particularly limited to the structure of the recording head, the carriage, the light source, and the like described above, and various aspects based on the gist of the ink jet recording method according to this embodiment can be adopted.

3. Recorded Material

A recorded material according to one embodiment of the invention is one recorded by the ink jet recording method described above. The image recorded on the recording medium is formed using the photocurable ink composition for ink jet recording described above, and thus glittering brightness can be imparted to the image.

The thickness of the ink layer formed on the recording medium is preferably 5 μm or more and 30 μm or lower. When the thickness of the ink layer is in the range mentioned above, glittering brightness can be imparted to the image and the curing properties of the ink layer become good. Thus, an image having brightness with excellent scratch resistance can be formed. When the thickness of the ink layer is 5 μm or more and 30 μm or lower, the cholesteric liquid crystal polymer having a thickness of about 5 μm can be firmly held in the image. When the thickness is lower than 5 μm, the brightness sometimes becomes insufficient. When the thickness exceeds 30 μm, a long time is required to cure the ink layer, and thus the movement rate of the carriage 50 needs to be made low, which sometimes results in a reduction in the printing rate.

The use of the recorded material according to this embodiment is not particularly limited and the recorded material can be used as an image recorded on the recording medium described above. The image recorded on the recording medium has glittering brightness, additional values can be imparted to the image.

4. Examples

Hereinafter, the invention will be more specifically described with reference to Examples but is not particularly limited to the Examples.

4.1. Preparation of Photocurable Ink Composition

In order to achieve the compositions of Tables 1 and 2, a polymerizable compound, a photopolymerization initiator, a surfactant, and a polymerization inhibitor were stirred and mixed to be completely dissolved. In order to achieve the compositions of Tables 1 and 2, a cholesteric liquid crystal polymer was further added to the solution, mixed and stirred at room temperature for 1 hour, and then filtered with a 50 μm membrane filter, thereby obtaining photocurable ink compositions shown in Tables 1 and 2.

The ingredients of the Tables are as follows.

(1) Polymerizable compound
 Phenoxyethylacrylate ("V#192" (trade name), manufactured by Osaka Organic Chemical Industry, Co. LTD.)
 Epoxy acrylate oligomer ("CN120" (trade name), manufactured by Sartomer Company)
 Tricyclodecanedimethanol diacrylate ("SR833" (trade name), manufactured by Sartomer Company)

(2) Photopolymerization initiator
 IRGACURE 819 (bis(2,4,6-trimethylbenzoyl)phenylphosphine oxide, manufactured by Ciba Japan, Inc.)
 DAROCUR TPO (2,4,6-trimethylbenzoyldiphenylphosphine oxide, manufactured by Ciba Japan, Inc.)

(3) Polymerization inhibitor
 Hydroquinone monomethyl ether ("P-methoxy phenol" (trade name), manufactured by Kanto Chemical Co., Ltd.)

(4) Surfactant
 BYK-UV3500 (manufactured by BYK-Chemie Japan K.K.)

(5) Cholesteric liquid crystal polymer
 HELICONE SCARABEUS XS (manufactured by Wacker Silicones)
 HELICONE JADE XS (manufactured by Wacker Silicones)
 HELICONE AQUARIUS XS (manufactured by Wacker Silicones)
 HELICONE SAPPHIRE XS (manufactured by Wacker Silicones)
 HELICONE MAPLE XS (manufactured by Wacker Silicones)
 HELICONE TITANIUM XS (manufactured by Wacker Silicones)

4.2. Evaluation Test Using Photocurable Ink Composition

4.2.1. Production of Recorded Material

First, an ink jet printer trial model having a head with a nozzle diameter of 200 μm and ultraviolet irradiation devices (UV-LED) at both sides of a carriage was prepared. The ink jet printer trial model has a recording medium feeding mechanism. The recording medium feeding mechanism has a heater capable of controlling the temperature. The heater can control the temperature of the recording medium during printing to a given temperature.

Next, the photocurable ink composition obtained in "4.1. Preparation of Photocurable Ink Composition" above was printed as a solid pattern image on a black PET film ("VC901" (trade name), manufactured by Sakurai Co., Ltd., A4 size), in which the temperature was controlled with the heater, under the conditions of a resolution of 180×180 dpi and a liquid droplet weight of 30 ng and also the ink composition was irradiated and cured with ultraviolet rays from the ultraviolet irradiation devices (UV-LED, emission peak wavelength of 395 nm, illumination of 60 mW/cm$^2$) mounted on the sides of the carriage, thereby obtaining a recorded material. The carriage movement rate was adjusted as appropriate in such a manner to achieve a state where stickiness was not felt when touching the solid pattern image (i.e., a completely cured state).

4.2.2. Evaluation of Scratch Resistance

According to JIS K5600-5-10 (General testing methods for paints-Part 5: Mechanical properties of coating film-Section 10: Scratch resistance (test piece moving back and forth method), the scratch resistance was evaluated for the recorded material obtained in "4.2.1. Production of Recorded Material" above. The evaluation criteria are classified as follows.
"A": The brightness of the image does not change at all.
"B": The brightness of the image was slightly lost.
"C": The brightness of the image was completely lost.

4.2.3. Evaluation of Ejection Properties

According to "4.2.1. Production of Recorded Material" above, 10 recorded materials were continuously produced. It was evaluated whether or not clogging occurred in nozzles of an ink jet printer during the production of the recorded materials.

The evaluation criteria are classified as follows.
"A": Clogging of nozzles did not occur.
"B": Clogging of nozzles occurred, but printing was continuously carried out.
"C": Clogging of nozzles occurred, and continuous printing was not carried out.

4.2.4. Evaluation of Line Width

The line width was evaluated by printing a bundle of thin lines with a line width of 1 pixel at a 5 pixel pitch in "4.2.1. Production of Recorded Material" above, and observing the collapse of the black base between the thin lines under an optical microscope.

The evaluation criteria are classified as follows.
"A": Collapse is not observed at all.
"B": Collapse is slightly observed.
"C": Collapse can be clearly confirmed.

4.2.5. Evaluation of Printing Rate

The time required for "4.2.1. Production of Recorded Material" above was evaluated.

The evaluation criteria are classified as follows.

"A": The time required for recording the solid pattern image was lower than 300 seconds.

"B": The time required for recording the solid pattern image was 300 seconds or more and lower than 600 seconds.

"C": The time required for recording the solid pattern image exceeded 600 seconds.

4.2.6. Evaluation of Brightness

The recorded material obtained in "4.2.1. Production of Recorded Material" above was visually confirmed for mirror reflection in a selective reflection wavelength range of 500 to 600 nm.

The evaluation criteria are classified as follows.

"A": Color rendering of a lame tone and a metallic tone was confirmed.

"B": Color rendering of a lame tone and a metallic tone was slightly confirmed.

"C": Color rendering of a lame tone and a metallic tone was not confirmed at all.

4.3. Evaluation Results

Figure 4:
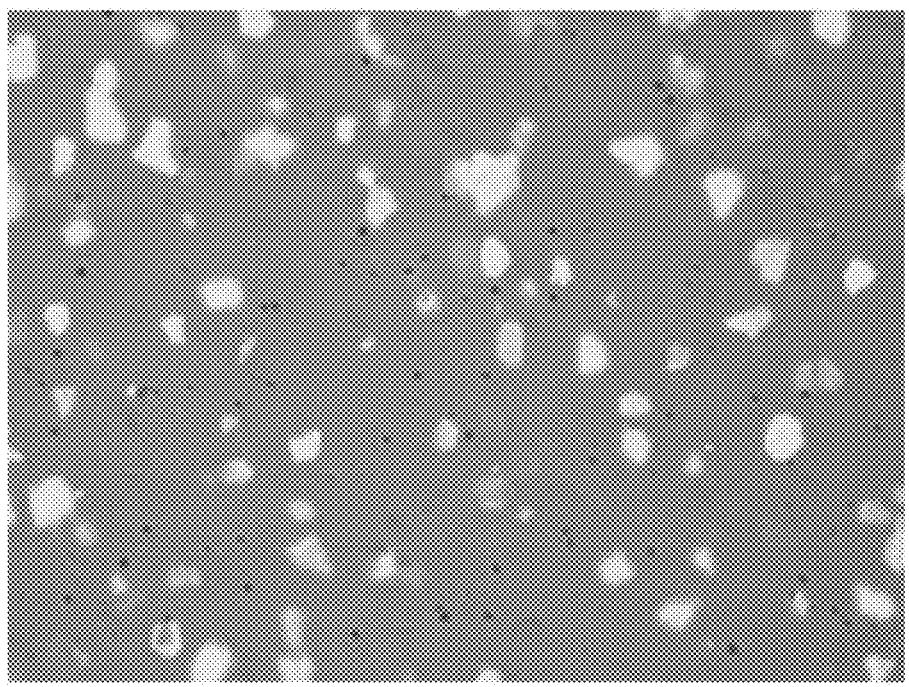
FIG. 4 is an optical microscope photograph of an image recorded in Example 1.

The evaluation results of the scratch resistance, ejection properties, line width, printing rate, and brightness above are collectively shown in Tables 1 and 2. FIG. 4 is a photograph observed by an optical microscope of the image formed in Example 1. The white spots observed in FIG. 4 are cholesteric liquid crystal polymers, and, in the actual image, the white spots render color of a lame tone and a metallic tone.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Cholesteric liquid crystal polymer (% by mass) | HELICONE SCARABEUS XS | 25.0 | | | | | | 50.0 | 10.0 | 5.0 | 55.0 | 25.0 |
| | HELICONE JADE XS | | 25.0 | | | | | | | | | |
| | HELICONE AQUARIUS XS | | | 25.0 | | | | | | | | |
| | HELICONE SAPPHIRE XS | | | | 25.0 | | | | | | | |
| | HELICONE MAPLE XS | | | | | 25.0 | | | | | | |
| | HELICONE TITANIUM XS | | | | | | 25.0 | | | | | |
| Polymerizable compound (% by mass) | Phenoxyethyl-acrylate | 42.4 | 42.4 | 42.4 | 42.4 | 42.4 | 42.4 | 17.4 | 57.4 | 62.4 | 12.4 | 39.1 |
| | Epoxy acrylate oligomer | 8.7 | 8.7 | 8.7 | 8.7 | 8.7 | 8.7 | 8.7 | 8.7 | 8.7 | 8.7 | 12.0 |
| | Tricyclodecane-dimethanol diacrylate | 14.8 | 14.8 | 14.8 | 14.8 | 14.8 | 14.8 | 14.8 | 14.8 | 14.8 | 14.8 | 14.8 |
| Photopolymerization initiator (% by mass) | IRGACURE 891 | 4.0 | 4.0 | 4.0 | 4.0 | 4.0 | 4.0 | 4.0 | 4.0 | 4.0 | 4.0 | 4.0 |
| | DAROCUR TPO | 4.8 | 4.8 | 4.8 | 4.8 | 4.8 | 4.8 | 4.8 | 4.8 | 4.8 | 4.8 | 4.8 |
| Polymerization inhibitor (% by mass) | Hydroquinone monomethyl ether | 0.05 | 0.05 | 0.05 | 0.05 | 0.05 | 0.05 | 0.05 | 0.05 | 0.05 | 0.05 | 0.05 |
| Surfactant (% by mass) | BYK-UV3500 | 0.2 | 0.2 | 0.2 | 0.2 | 0.2 | 0.2 | 0.2 | 0.2 | 0.2 | 0.2 | 0.2 |
| Viscosity of photocurable ink composition (mPa·s) | | 43 | 43 | 43 | 43 | 43 | 43 | 52 | 40 | 39 | 55 | 60 |
| Curing conditions | Heat temperature of recording medium (° C.) | 35 | 35 | 35 | 35 | 35 | 35 | 35 | 35 | 35 | 35 | 35 |
| | Formed film thickness (μm) | 20 | 20 | 20 | 20 | 20 | 20 | 20 | 20 | 20 | 20 | 20 |
| | Time to UV irradiation (second) | 1 | 1 | 1 | 1 | 1 | 1 | 1 | 1 | 1 | 1 | 1 |
| Evaluation results | Scratch resistance evaluation | A | A | A | A | A | A | A | A | A | A | A |
| | Ejection properties evaluation | A | A | A | A | A | A | A | A | A | B | B |
| | Line width evaluation | A | A | A | A | A | A | A | A | A | A | A |
| | Printing rate evaluation | A | A | A | A | A | A | A | A | A | A | A |
| | Brightness evaluation | A | A | A | A | A | A | A | A | B | A | A |

TABLE 2

| | | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|
| Cholesteric liquid crystal polymer (% by mass) | HELICONE SCARABEUS XS | 25.0 | 25.0 | 25.0 | 25.0 | 25.0 | 25.0 | 25.0 | 25.0 | 25.0 | 25.0 | 25.0 |
| Polymerizable compound (% by mass) | Phenoxyethyl-acrylate | 42.4 | 42.4 | 42.4 | 42.4 | 42.4 | 42.4 | 42.4 | 42.4 | 42.4 | 42.4 | 42.4 |
| | Epoxy acrylate oligomer | 8.7 | 8.7 | 8.7 | 8.7 | 8.7 | 8.7 | 8.7 | 8.7 | 8.7 | 8.7 | 8.7 |
| | Tricyclodecane-dimethanol diacrylate | 14.8 | 14.8 | 14.8 | 14.8 | 14.8 | 14.8 | 14.8 | 14.8 | 14.8 | 14.8 | 14.8 |
| Photopolymerization initiator (% by mass) | IRGACURE 891 | 4.0 | 4.0 | 4.0 | 4.0 | 4.0 | 4.0 | 4.0 | 4.0 | 4.0 | 4.0 | 4.0 |
| | DAROCUR TPO | 4.8 | 4.8 | 4.8 | 4.8 | 4.8 | 4.8 | 4.8 | 4.8 | 4.8 | 4.8 | 4.8 |
| Polymerization inhibitor (% by mass) | Hydroquinone monomethyl ether | 0.05 | 0.05 | 0.05 | 0.05 | 0.05 | 0.05 | 0.05 | 0.05 | 0.05 | 0.05 | 0.05 |
| Surfactant (% by mass) | BYK-UV3500 | 0.2 | 0.2 | 0.2 | 0.2 | 0.2 | 0.2 | 0.2 | 0.2 | 0.2 | 0.2 | 0.2 |
| Viscosity of photocurable ink composition (mPa·s) | | 43 | 43 | 43 | 43 | 43 | 43 | 43 | 43 | 43 | 43 | 43 |

TABLE 2-continued

|  |  | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|---|
| Curing conditions | Heat temperature of recording medium (° C.) | 30 | 40 | 25 | 45 | 35 | 35 | 35 | 35 | 35 | 35 | 35 |
|  | Formed film thickness (μm) | 20 | 20 | 20 | 20 | 5 | 30 | 35 | 2 | 20 | 20 | 20 |
|  | Time to UV irradiation (second) | 1 | 1 | 1 | 1 | 1 | 1 | 1 | 1 | 5 | 10 | 15 |
| Evaluation results | Scratch resistance evaluation | A | A | A | A | A | A | A | B | A | A | A |
|  | Ejection properties evaluation | A | A | A | A | A | A | A | A | A | B | B |
|  | Line width evaluation | A | A | B | B | A | A | A | A | A | A | A |
|  | Printing rate evaluation | A | A | A | A | A | A | B | A | A | A | B |
|  | Brightness evaluation | A | A | A | A | A | A | A | B | A | A | A |

According to the photocurable ink compositions of Examples 1 to 22 shown in Tables 1 and 2, it was turned out that the evaluation results are good in all the evaluation criteria of scratch resistance, ejection properties, line width, printing rate, and brightness. The following findings were obtained depending on differences in the compositions or curing conditions of the photocurable ink compositions.

In Example 9, the content of the cholesteric liquid crystal polymers in the photocurable ink composition was small, and thus a tendency was confirmed in which the brightness of the image was impaired.

In Examples 10 and 11, the viscosity of the photocurable ink compositions was as high as 55 mPa·s or more, and thus a tendency was confirmed in which the nozzles were easily clogged during continuous printing.

In Examples 14 and 15, the preheating temperature of the recording media was not preferable, and thus the collapse of the black base between the line widths was slightly confirmed.

In Example 18, the formed film thickness of the ink layer was excessively large, a prolonged light irradiation time was required for completely curing the ink layer, and thus the printing rate became somewhat low.

In Example 19, the formed film thickness of the ink layer was excessively small, and thus a tendency was confirmed in which the scratch resistance deceased and the brightness of the image was impaired. However, it was confirmed that the image formed in Example 19 had more favorable scratch resistance than that of an image formed using a former water-based ink composition containing a cholesteric liquid crystal polymer. The reason why the scratch resistance of the image formed using the former water-based ink composition is poor is considered as follows. In the former water-based ink composition to which about 10% of a former water-based binder was added, most ingredients contained in the water-based ink composition volatilize during image formation. Therefore, the formed film thickness of the image formed using the water-based ink composition inevitably becomes small. Thus, it is considered that the cholesteric liquid crystal polymers having a film thickness of about 5 μm are exposed to the image surface, resulting in a reduction in the scratch resistance of the image.

In Example 22, by setting the time to emitting light after ejecting ink to be long, the carriage movement rate was required to be low, and thus the printing rate became somewhat low.

The invention is not particularly limited to the embodiments described above, and various modifications can be carried out. For example, the invention includes the substantially same structure (e.g., a structure having the same functions, methods, and results or a structure having the same objects and effects) as the structure described in the embodiments. The invention also includes a structure in which portions that are not essential in the structure described in the embodiments are replaced. The invention also includes a structure capable of demonstrating the same effects as those of the structure described in the embodiments above or a structure capable of achieving the same objects as those of the structure described in the embodiments above. The invention also includes a structure in which known techniques are added to the structure described in the embodiments.

What is claimed is:

1. A photocurable ink composition for ink jet recording comprising:
    a cholesteric liquid crystal polymer having a content of 10% by mass or more and 50% by mass or lower, and the shape of the cholesteric liquid crystal polymer is a plate-like particular shape having an average particle size (R50) of a circle-equivalent diameter of a substantially flat surface (X-Y plane) of 50 μm or lower;
    a polymerizable compound having a content of 20% mass or more; and
    a photopolymerization initiator;
    wherein the viscosity of the photocurable ink composition at 20° C. is 3 mPa·s or more and lower than 55 mPa·s.

2. The photocurable ink composition for ink jet recording according to claim 1, comprising phenoxyethylacrylate as the polymerizable compound.

3. The photocurable ink composition for ink jet recording according to claim 2, further comprising at least one selected from alkylene glycol diacrylate and diacrylate having an alicyclic structure as the polymerizable compound.

4. An ink jet recording method, comprising:
    a process (a) for ejecting the photocurable ink composition for ink jet recording according to claim 2 onto a recording medium using an ink jet recording apparatus; and
    a process (b) for irradiating the ejected photocurable ink composition for ink jet recording with light having an emission peak wavelength in the range of 350 nm or more and 430 nm or lower from a light source.

5. The ink jet recording method according to claim 4, wherein, in the process (a), when the photocurable ink composition for ink jet recording is ejected onto the recording medium, the recording medium is held at a temperature of 30° C. or more and 40° C. or lower.

6. A recorded material, which is a recorded material, on which recording is performed by the ink jet recording method according to claim 5,
the thickness of an ink layer formed on the recording medium being 5 µm or more and 30 µm or lower.

7. The ink jet recording method according to claim 4, wherein the interval between the process (a) and the process (b) is 10 seconds or lower.

8. A recorded material, which is a recorded material, on which recording is performed by the ink jet recording method according to claim 7,
the thickness of an ink layer formed on the recording medium being 5 µm or more and 30 µm or lower.

9. A recorded material, which is a recorded material, on which recording is performed by the ink jet recording method according to claim 4,
the thickness of an ink layer formed on the recording medium being 5 µm or more and 30 µm or lower.

10. An ink jet recording method, comprising:
a process (a) for ejecting the photocurable ink composition for ink jet recording according to claim 1 onto a recording medium using an ink jet recording apparatus; and
a process (b) for irradiating the ejected photocurable ink composition for ink jet recording with light having an emission peak wavelength in the range of 350 nm or more and 430 nm or lower from a light source.

11. The ink jet recording method according to claim 10, wherein, in the process (a), when the photocurable ink composition for ink jet recording is ejected onto the recording medium, the recording medium is held at a temperature of 30° C. or more and 40° C. or lower.

12. A recorded material, which is a recorded material, on which recording is performed by the ink jet recording method according to claim 11,
the thickness of an ink layer formed on the recording medium being 5 µm or more and 30 µm or lower.

13. The ink jet recording method according to claim 10, wherein the interval between the process (a) and the process (b) is 10 seconds or lower.

14. A recorded material, which is a recorded material, on which recording is performed by the ink jet recording method according to claim 13,
the thickness of an ink layer formed on the recording medium being 5 µm or more and 30 µm or lower.

15. A recorded material, which is a recorded material, on which recording is performed by the ink jet recording method according to claim 10,
the thickness of an ink layer formed on the recording medium being 5 µm or more and 30 µm or lower.

16. The photocurable ink composition of claim 1, wherein the shape of the cholesteric liquid crystal polymer is a plate-like particular shape having an average particle size (R50) of a circle-equivalent diameter of a substantially flat surface (X-Y plane) of 10 µm or more and 40 µm or lower.

17. The photocurable ink composition of claim 1, wherein the average particle size of the cholesteric liquid crystal polymer includes a thickness (z) of 0.4 µm or more and 8 µm or lower.

* * * * *